United States Patent
Tatewaki et al.

(10) Patent No.: US 11,781,636 B1
(45) Date of Patent: Oct. 10, 2023

(54) GEARBOX FOR VEHICLE SEAT

(71) Applicant: TOYOTA BOSHOKU KABUSHIKI KAISHA, Aichi (JP)

(72) Inventors: Kenji Tatewaki, Aichi (JP); Tomokazu Fukuda, Aichi (JP); Kentaro Morishita, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/131,109

(22) Filed: Apr. 5, 2023

(30) Foreign Application Priority Data

Jun. 7, 2022 (JP) ................................ 2022-092397

(51) Int. Cl.
*F16H 57/00* (2012.01)
*F16H 57/021* (2012.01)
*F16H 57/039* (2012.01)
*F16H 57/02* (2012.01)

(52) U.S. Cl.
CPC ......... *F16H 57/021* (2013.01); *F16H 57/039* (2013.01); *F16H 2057/02082* (2013.01)

(58) Field of Classification Search
CPC ................ F16H 57/021; F16H 57/039; F16H 2057/02082; F16H 25/186; F16H 25/20; F16H 2025/204; F16H 2025/2084; B60N 2205/00; H02K 7/06
See application file for complete search history.

(56) References Cited

U.S. PATENT DOCUMENTS

2008/0261745 A1 * 10/2008 Paul ..................... H02K 7/116
 475/207
2013/0075189 A1 * 3/2013 Sekikawa ............... F16C 23/08
 180/444

FOREIGN PATENT DOCUMENTS

EP          1744082 A1 *  1/2007  .............. F16C 23/04
JP       2001-330027 A    11/2001
JP       2002136038 A  *  5/2002

\* cited by examiner

*Primary Examiner* — Zakaria Elahmadi
(74) *Attorney, Agent, or Firm* — Greenblum & Bernstein, P.L.C.

(57) ABSTRACT

Provided is a gearbox for vehicle seats that can inhibit rattling of its shaft while inhibiting an increase in sliding resistance at a shaft end. The gearbox is used in a movable mechanism of a vehicle seat, and including a housing, a thrust bearing, and a cap. The housing accommodates a shaft, a gear, and a rotary bearing therein, and includes a female screw portion. The thrust bearing includes a force applied portion to be in contact with an end of the shaft, a male screw portion threadedly engaged with the female screw portion, and an engaged portion arranged to interpose the male screw portion between the engaged portion and the force applied portion in an axial direction of the shaft. The cap includes an engaging portion in engagement with the engaged portion of the thrust bearing, and a removal stopper restricting removal of the thrust bearing from the housing.

7 Claims, 9 Drawing Sheets

GEARBOX FOR VEHICLE SEAT

CROSS-REFERENCE TO RELATED APPLICATIONS

The present application claims the benefit of Japanese Patent Application No. 2022-092397 filed on Jun. 7, 2022 with the Japan Patent Office, the entire disclosure of which is incorporated herein by reference.

BACKGROUND

The present disclosure relates to a gearbox for a vehicle seat.

Vehicle seats installed in, for example, motor vehicles have gearboxes as driving sources to displace part of the seats. Each gearbox includes a shaft, a gear, and a thrust bearing that are configured to transmit motor drive.

The shaft, when being rotated, rattles in the axial direction. To inhibit noise caused by such rattling, there is a known structure in which the position of the thrust bearing is adjusted with a screw to thereby press the leading end of the shaft against the thrust bearing (see Japanese Unexamined Patent Application Publication No. 2001-330027).

SUMMARY

In the above-described thrust bearing adjustment mechanism with the screw, torque for fastening the screw must be large to avoid loosening of the screw which can be caused by a thrust load applied to the screw. This results in an increase in the pressing force (that is, sliding resistance) of the thrust bearing against the shaft, and thus an increase in loss of the driving force due to friction.

It is desirable that one aspect of the present disclosure provides a gearbox for a vehicle seat that can inhibit rattling of a shaft therein while inhibiting an increase in sliding resistance at an end of the shaft.

One aspect of the present disclosure provides a gearbox for a vehicle seat. The gearbox is used in a movable mechanism configured to displace part of the vehicle seat. The gearbox comprises a shaft, a gear secured to the shaft, a rotary bearing rotatably supporting the shaft, a housing accommodating the shaft, the gear, and the rotary bearing therein and including a female screw portion.

The gearbox further comprises a thrust bearing including a force applied portion configured to be in contact with an end of the shaft, a male screw portion in thread engagement with the female screw portion, and an engaged portion arranged such that the male screw portion is interposed between the engaged portion and the force applied portion in an axial direction of the shaft. The gearbox still further comprises a cap including an engaging portion in engagement with the engaged portion of the thrust bearing, and a removal stopper restricting removal of the thrust bearing from the housing. The removal stopper is mounted to the housing, or inserted in the thrust bearing to thereby press the thrust bearing against the housing.

In such a configuration, the cap restricts movement of the thrust bearing in the axial direction of the shaft. This can minimize torque for fastening the male screw portion of the thrust bearing and the female screw portion of the housing. Thus, this configuration can inhibit rattling of the shaft while inhibiting an increase in sliding resistance at the end of the shaft.

In one aspect of the present disclosure, the removal stopper may be mounted to the housing. The cap may include a cap rotation stopper restricting rotation of the engaging portion and the removal stopper about a central axis of the shaft with respect to the housing. This configuration restricts rotation of the thrust bearing with respect to the housing, thereby inhibiting the fastening between the male screw portion and the female screw portion from being loosened.

In one aspect of the present disclosure, the removal stopper may include a cylindrical body inserted in the housing. The cap rotation stopper may include a serration with teeth extending from an outer circumferential surface of the removal stopper and arranged in a row along a circumferential direction of the removal stopper. In such a configuration, it is possible, with a relatively simple configuration, to enhance the effect of restricting rotation of the cap with respect to the housing.

In one aspect of the present disclosure, the housing may include a shaft housing portion with a cylindrical shape, and a cylindrical holder within the shaft housing portion. The holder may include the female screw portion, and a bearing holder holding the rotary bearing. With such a configuration, an insertion of the holder in the shaft housing portion enables the rotary bearing and the female screw portion to be arranged within the housing.

In one aspect of the present disclosure, the holder may include a holder rotation stopper restricting rotation of the female screw portion and the bearing holder about a central axis of the shaft with respect to the shaft housing portion. The shaft housing portion may include a restrictor restricting movement of the holder in a transmission direction of a thrust load at the force applied portion. This configuration restricts rotation and movement of the holder, thereby inhibiting the fastening between the male screw portion and the female screw portion from being loosened.

In one aspect of the present disclosure, the engaging portion may include a cylindrical first base in which the engaged portion of the thrust bearing is inserted, and a first protrusion or recess in an inner circumferential surface of the first base. In such a configuration, it is possible to enhance the strength of the engagement of the cap with the thrust bearing with a relatively simple structure.

In one aspect of the present disclosure, the removal stopper may include a cylindrical second base inserted in the housing, and a second protrusion or recess in an outer circumferential surface of the second base. In such a configuration, it is possible, with a relatively simple configuration, to enhance the effect of inhibiting removal of the cap from the housing.

BRIEF DESCRIPTION OF THE DRAWINGS

Embodiments of the present disclosure will be described by way of example with reference to the accompanying drawings, in which.

DETAILED DESCRIPTION OF EXEMPLARY EMBODIMENTS

1. First Embodiment

[1-1. Configuration]

Figure 1:
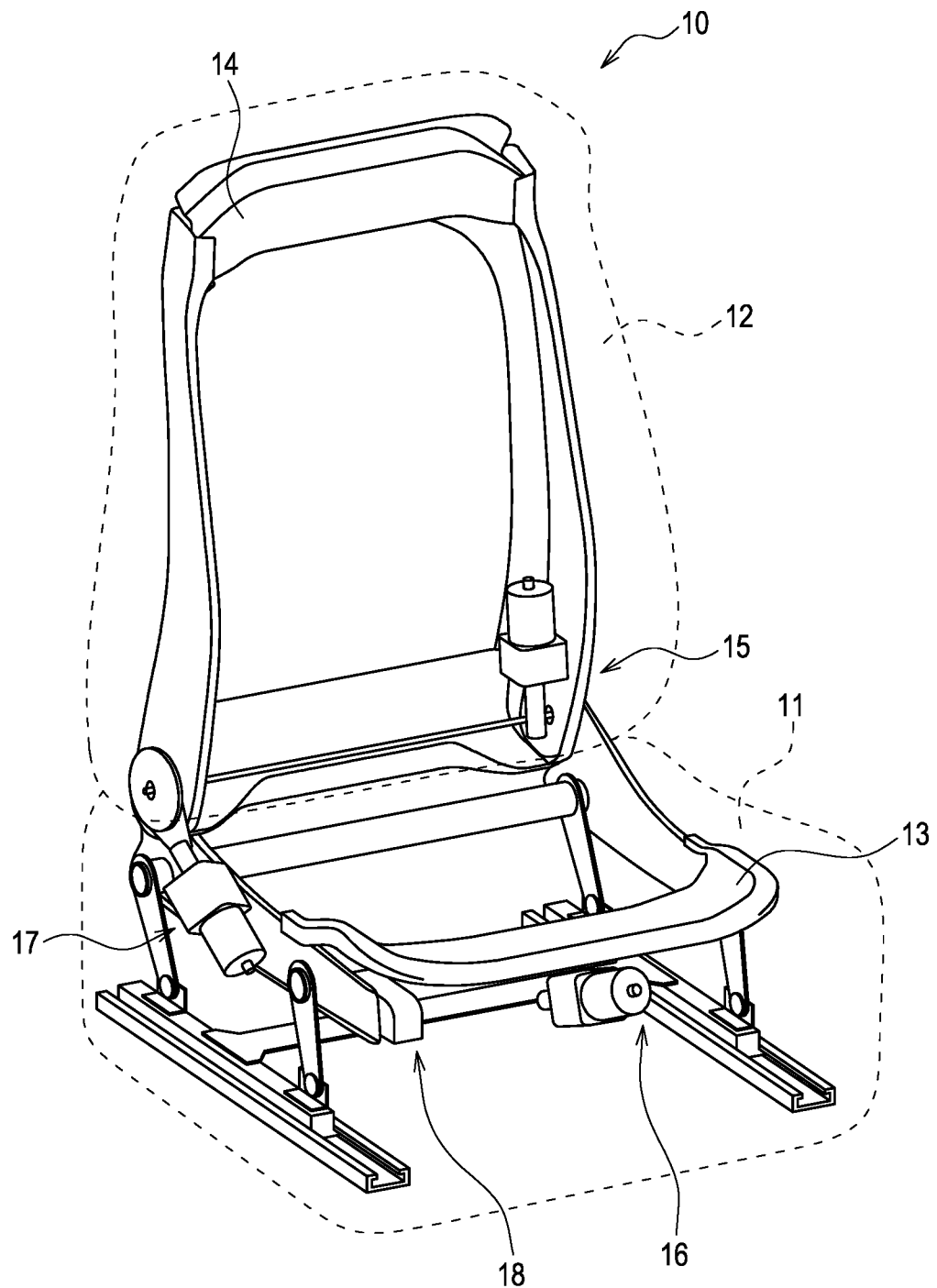
FIG. 1 is a schematic perspective view of a vehicle seat according to an embodiment.

FIG. 1 illustrates a vehicle seat 10 including a seat cushion 11, a seatback 12, a cushion frame 13, a back frame 14, a reclining device 15, a sliding device 16, a lifting device 17, and a tilting device 18.

The vehicle seat 10 is used as a seat of, for example, motor vehicles such as passenger cars, railroad vehicles, ships and boats, and aircrafts. The seat cushion 11 supports an occupant's buttocks and other body parts. The seatback 12 supports the occupant's back. The cushion frame 13 supports the seat cushion 11. The back frame 14 supports the seatback 12.

The reclining device 15 is a known movable mechanism that enables the back frame 14 to pivot with respect to the cushion frame 13 in seat front-rear directions. The sliding device 16 is a known movable mechanism that supports the cushion frame 13 such that the cushion frame 13 is slidable in the seat front-rear directions.

The lifting device 17 is a known movable mechanism that raises and lowers the cushion frame 13. The tilting device 18 is a known movable mechanism that enables the front end of the cushion frame 13 to pivot upward and downward.

Figure 2:
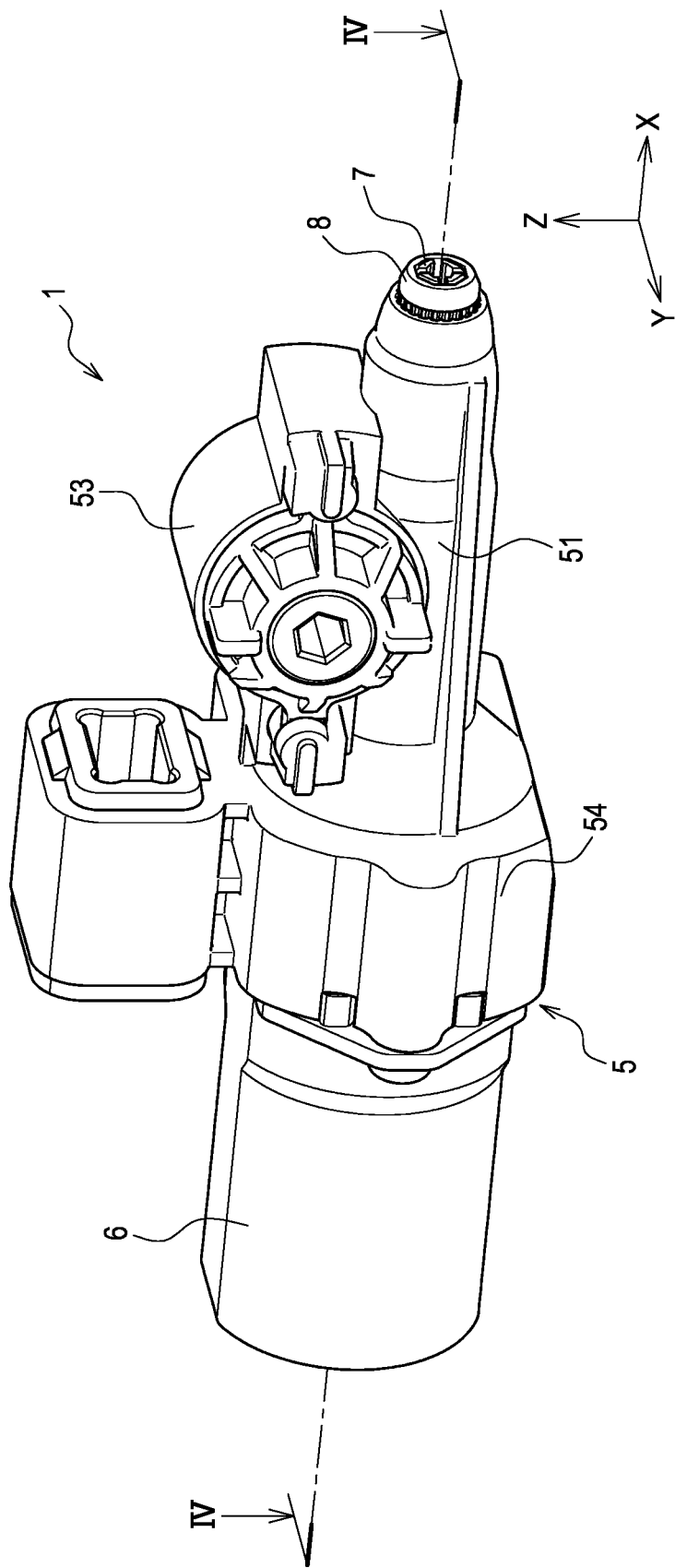
FIG. 2 is a schematic perspective view of a gearbox of the vehicle seat in FIG. 1.

Each of the reclining device 15, the sliding device 16, the lifting device 17, and the tilting device 18 has a gearbox 1 illustrated in FIG. 2 as a driving source.

<Gearbox>

Figure 3:
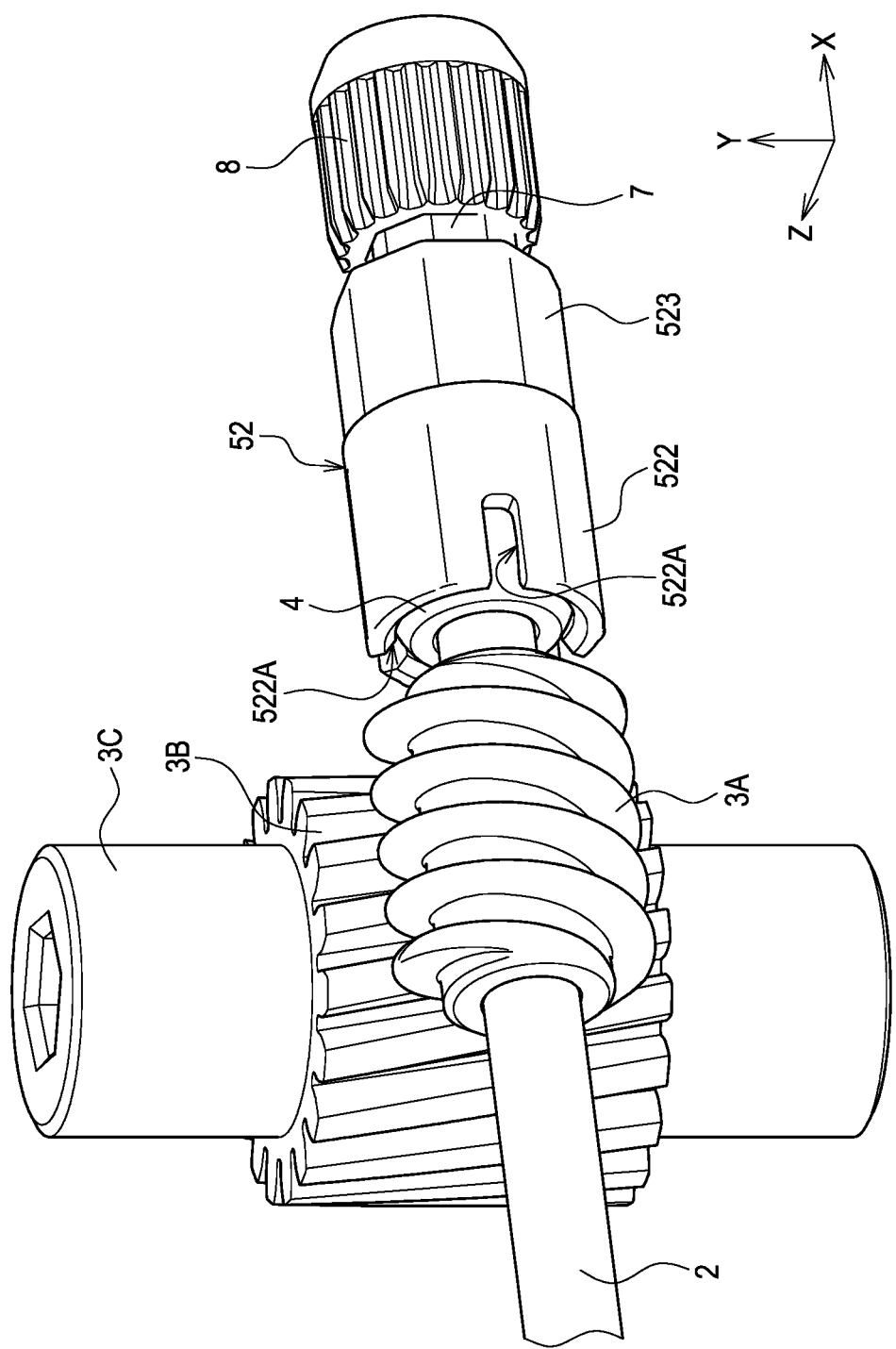
FIG. 3 is a schematic perspective view of the internal structure of the gearbox in FIG. 2.

As illustrated in FIGS. 2 and 3, the gearbox 1 includes a shaft 2, a first gear 3A, a second gear 3B, a rotary bearing 4, a housing 5, an actuator 6, a thrust bearing 7, and a cap 8.

In the present embodiment, an axis parallel to the central axis of the shaft 2 (that is, the rotation axis of the first gear 3A) is defined as X-axis, an axis parallel to the rotation axis of the second gear 3B is defined as Y-axis, and an axis orthogonal to both X-axis and Y-axis is defined as Z-axis.

<Shaft>

The shaft 2 illustrated in FIG. 3 is coupled to the actuator 6 to be axially rotated by the driving force of the actuator 6.

<First Gear>

The first gear 3A is secured to the shaft 2 by, for example, press-fit. In the present embodiment, the first gear 3A is a worm (that is, a screw gear) meshing with the second gear 3B. However, the first gear 3A is not limited to a worm and may be, for example, a helical gear.

<Second Gear>

The second gear 3B is coupled to the first gear 3A to be rotated by the driving force transmitted from the first gear 3A. The rotation axis of the second gear 3B intersects with (specifically, is orthogonal to) the rotation axis of the first gear 3A.

In the present embodiment, the second gear 3B is a worm wheel (that is, gear with slanted teeth) meshing with the first gear 3A. However, the second gear 3B is not limited to a worm wheel and may be, for example, a helical gear.

The driving force sent to the second gear 3B is transmitted to displacement members, such as cams and links, of the movable mechanisms (that is, the reclining device 15, the sliding device 16, lifting device 17, and the tilting device 18) via an output shaft 3C.

<Rotary Bearing>

The rotary bearing 4 is an annular member supporting the shaft 2. The rotary bearing 4 is made of, for example, sintered metal.

The rotary bearing 4 is arranged along the X-axis between the first gear 3A and the thrust bearing 7. Specifically, in the rotary bearing 4, a portion of the shaft 2 is inserted. The portion is located on the side of the first gear 3A proximate to the leading-end (that is, the end away from the actuator 6) of the shaft 2.

<Housing>

The housing 5 illustrated in FIG. 2 accommodates at least the shaft 2, the first gear 3A, the rotary bearing 4, and the second gear 3B therein.

The housing 5 includes a shaft housing portion 51, a holder 52 (see FIG. 3), a second-gear housing portion 53, and an actuator coupling portion 54. The housing 5 is made of, for example, resin.

Figure 4:
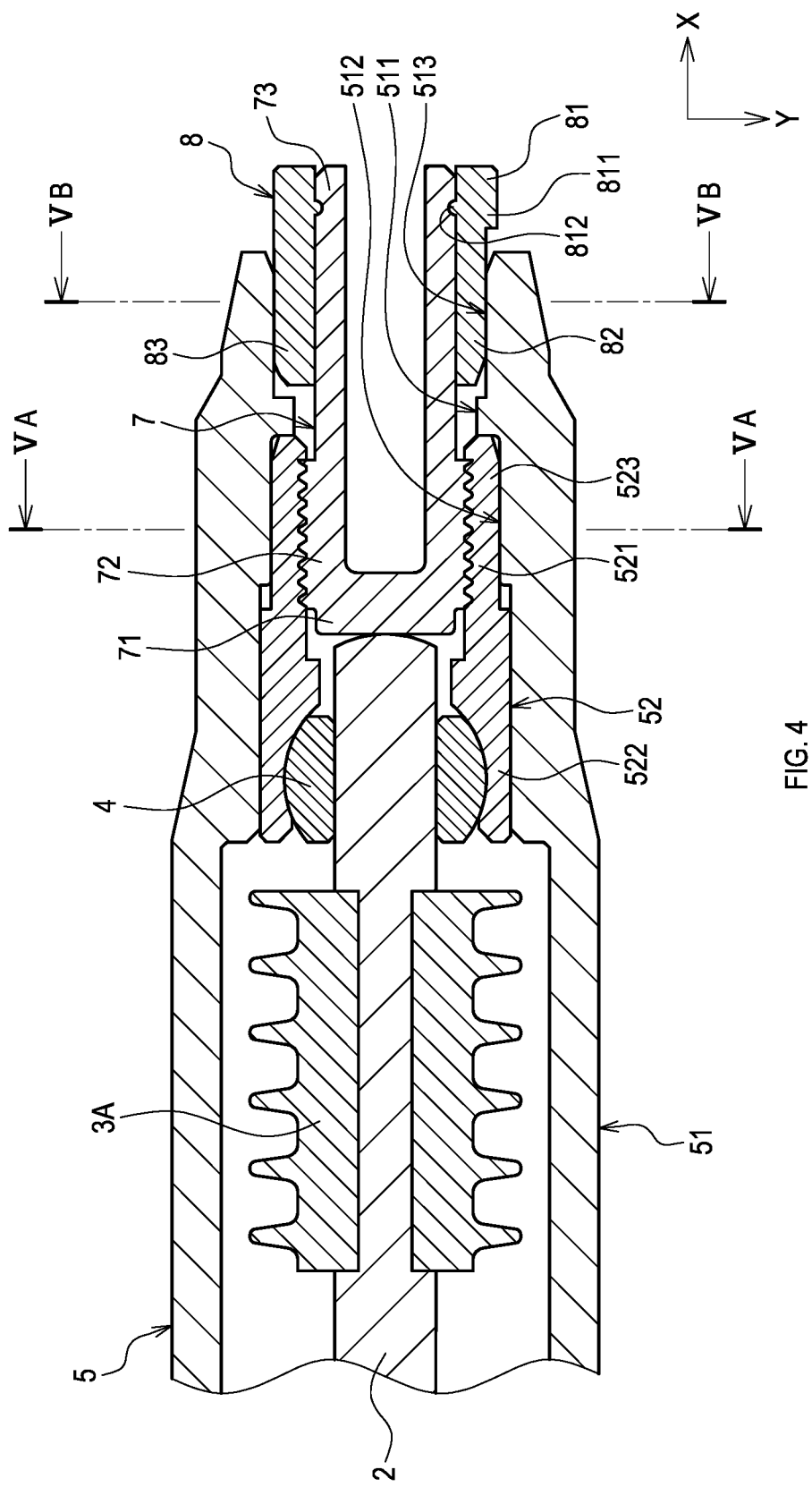
FIG. 4 is a schematic end view of a cross section of the gearbox taken along line IV-IV in FIG. 2.

The shaft housing portion 51 is a cylindrical portion accommodating the first gear 3A therein. The shaft housing portion 51 extends from the actuator coupling portion 54 along the X-axis. As illustrated in FIG. 4, the shaft housing portion 51 includes a restrictor 511, a holder receiver 512, and a cap receiver 513.

The restrictor 511 is in contact with an end of the holder 52, thereby restricting movement of the holder 52 in a transmission direction of a thrust load at a force applied portion 71 of the thrust bearing 7 (that is, in a direction parallel to the X-axis and away from the shaft 2). The restrictor 511 includes a portion of the shaft housing portion 51 in which the inner circumferential surface of the shaft housing portion 51 protrudes radially inward (that is, a portion with a reduced diameter).

Figure 5A:
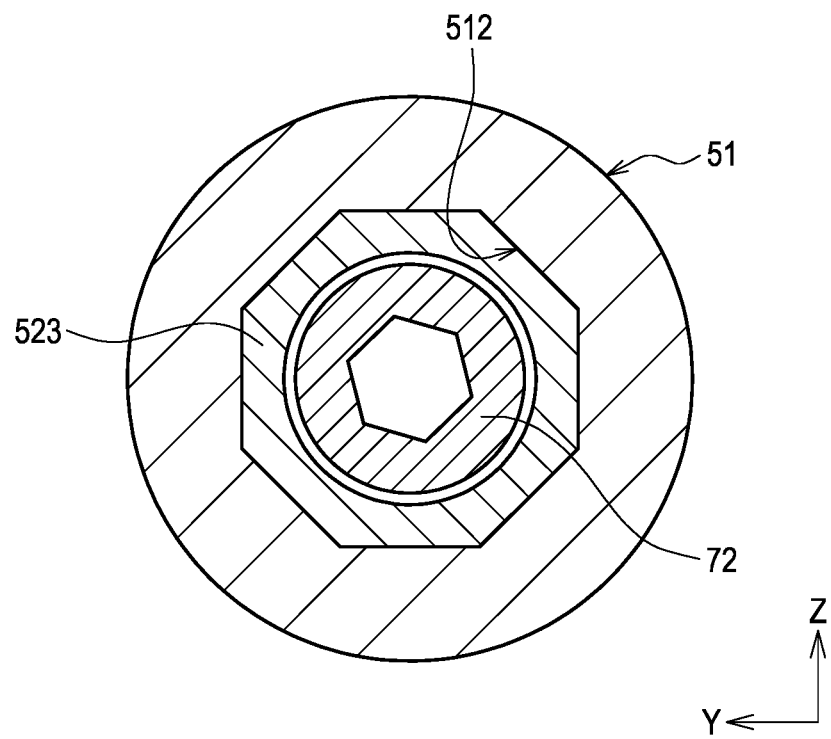
FIG. 5A is a schematic cross-sectional view of the gearbox taken along line VA-VA in FIG. 4.

The holder receiver 512 is a portion into which a holder rotation stopper 523 of the holder 52 is inserted. As illustrated in FIG. 5A, the holder receiver 512 has an inner peripheral surface forming, when viewed in a direction parallel to the central axis thereof, a polygonal shape that is substantially the same as the shape formed by the outer peripheral surface of the holder rotation stopper 523.

Figure 5B:
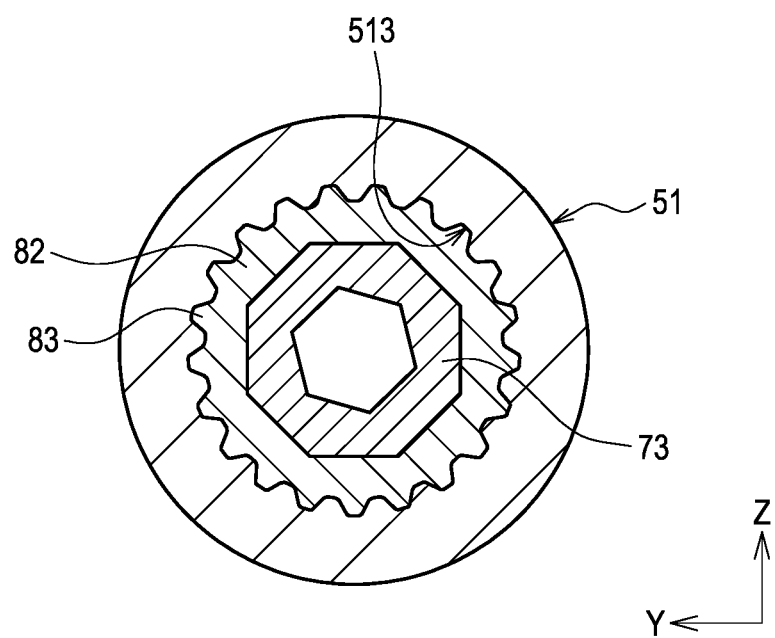
FIG. 5B is a schematic cross-sectional view of the gearbox taken along line VB-VB in FIG. 4.

The cap receiver 513 is a portion into which a removal stopper 82 of the cap 8 is inserted. As illustrated in FIG. 5B, the cap receiver 513 includes, as viewed in a direction parallel to the central axis thereof, receiving grooves in which teeth of a serration forming the cap rotation stopper 83 can be inserted.

As illustrated in FIG. 4, the holder 52 is a cylindrical member arranged within the shaft housing portion 51. The holder 52 includes a female screw portion 521, a bearing holder 522, and the holder rotation stopper 523.

The female screw portion 521 is threadedly engaged with a male screw portion 72 of the thrust bearing 7. The female screw portion 521 has a cylindrical body with screw threads and screw grooves formed in the inner circumferential surface. The female screw portion 521 is located outward in relation to the leading-end of the shaft 2 in the axial direction of the shaft housing portion 51.

The bearing holder 522 holds the rotary bearing 4. The rotary bearing 4 is, for example, press-fitted within the bearing holder 522. As illustrated in FIG. 3, the bearing holder 522 has slits 522A extending from the end of the holder 52 along the X-axis.

The holder rotation stopper 523 restricts rotation of the female screw portion 521 and the bearing holder 522 about the central axis of the shaft 2 with respect to the shaft housing portion 51. The holder rotation stopper 523 includes a cylindrical body on which the female screw portion 521 is formed.

The holder rotation stopper 523 has an outer peripheral surface forming a polygonal shape when viewed in the axial direction of the female screw portion 521. With the holder rotation stopper 523 inserted in the holder receiver 512 of the shaft housing portion 51, rotation of the entire holder 52 is restricted.

The second-gear housing portion 53 illustrated in FIG. 2 accommodates the second gear 3B therein. The internal space of the second-gear housing portion 53 communicates with the internal space of the shaft housing portion 51. The actuator coupling portion 54 is coupled to the actuator 6. The shaft 2 is arranged across the interior of the actuator coupling portion 54 and the interior of the shaft housing portion 51.

<Actuator>

The actuator 6 is a power source that drives the shaft 2. The actuator 6 may be, for example, a motor. However, the actuator 6 may rotate the shaft 2 with pneumatic or hydraulic pressure.

<Thrust Bearing>

As illustrated in FIG. 4, the thrust bearing 7 includes the force applied portion 71, the male screw portion 72, and an engaged portion 73.

The force applied portion 71 is configured to be in contact with the leading-end of the shaft 2. The force applied portion 71 is pressed by the shaft 2 in a direction parallel to the X-axis. The force applied portion 71 defines the inward end of the thrust bearing 7.

The force applied portion 71 may be molded with resin integrally with the male screw portion 72, or may be formed with, for example, metal separately from the male screw portion 72. The shape of the force applied portion 71 is not limited to a particular shape and may be spherical.

The male screw portion 72 is in thread engagement with the female screw portion 521 of the holder 52. The male screw portion 72 has a cylindrical or columnar body with screw threads and screw grooves formed in the outer peripheral surface thereof. The male screw portion 72 is arranged adjacent to the force applied portion 71.

The engaged portion 73 is arranged at a position where the male screw portion 72 is interposed between the engaged portion 73 and the force applied portion 71 in the axial direction of the shaft 2. The engaged portion 73 includes the outward end of the thrust bearing 7 (that is, the end away from the force applied portion 71). The engaged portion 73 is integrally formed with the male screw portion 72. The male screw portion 72 and the engaged portion 73 are made of, for example, resin.

The engaged portion 73 is engaged with an engaging portion 81 of the cap 8. The engaged portion 73 penetrates the cap 8 along the X-axis. At least a portion of the engaged portion 73 protrudes from the shaft housing portion 51 of the housing 5.

Figure 6A:
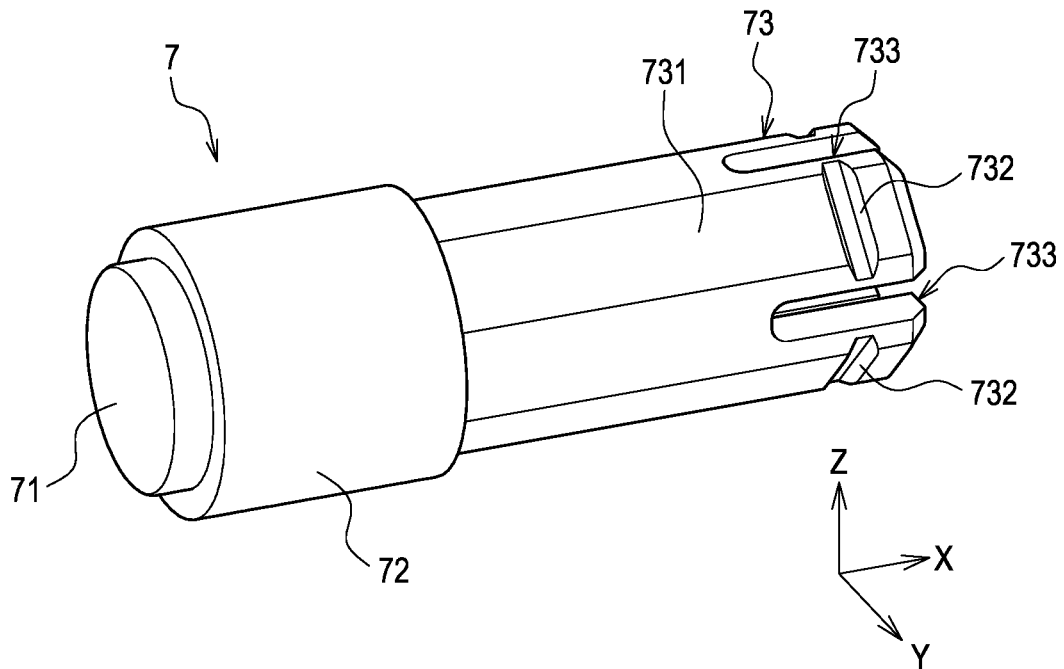
FIG. 6A and FIG. 6B are schematic perspective views of a thrust bearing of the gearbox in FIG. 2.
Figure 6B:
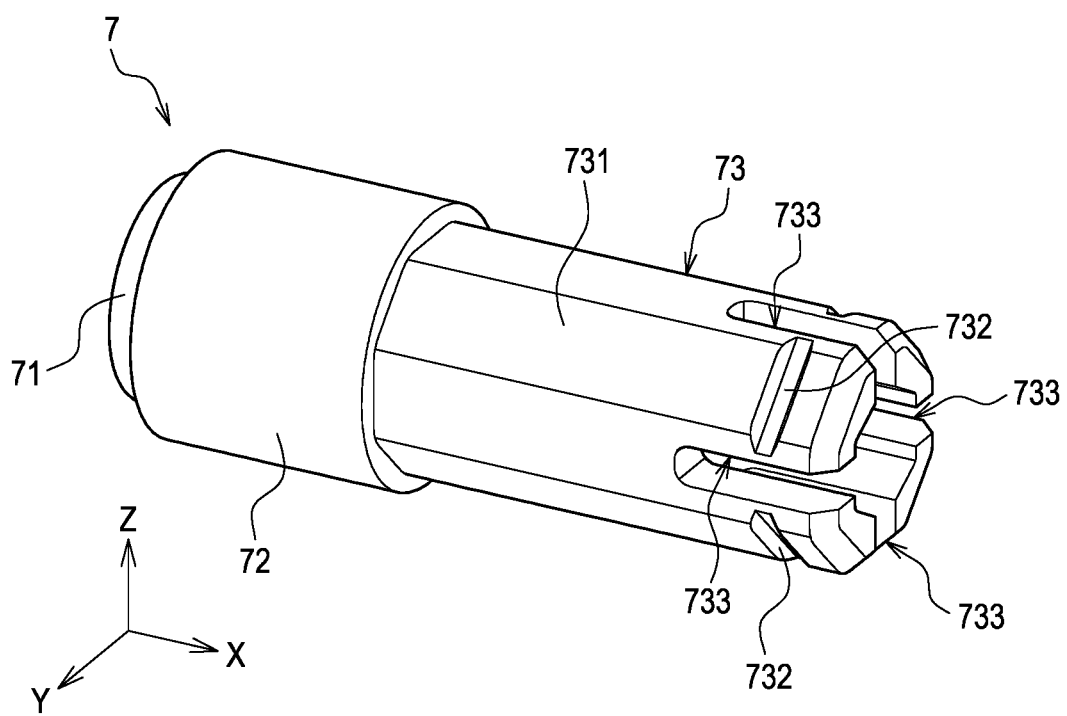

As illustrated in FIGS. 6A and 6B, the engaged portion 73 includes an inserted portion 731, recesses 732, and slits 733. In FIGS. 6A and 6B, the screw threads and screw grooves of the male screw portion 72 are not illustrated.

The inserted portion 731 restricts rotation of the male screw portion 72 about the central axis of the shaft 2 with respect to the cap 8. The inserted portion 731 includes a cylindrical body with an outer peripheral surface that forms, when viewed in the axial direction, a polygonal shape. With the inserted portion 731 inserted in a first base 811 of the cap 8, rotation of the entire thrust bearing 7 is restricted.

The recesses 732 are indentations made in part of the outer peripheral surface of the inserted portion 731. The recesses 732 extend in the radial direction of the inserted portion 731 and are separated from each other by the slits 733. The slits 733 extends from the end of the inserted portion 731 along the X-axis.

<Cap>

As illustrated in FIG. 4, the cap 8 is inserted in the end (that is, the opening) of the shaft housing portion 51.

The cap 8 is located outward of the housing 5 in relation to the holder 52. The cap 8 includes the engaging portion 81, the removal stopper 82, and a cap rotation stopper 83. The cap 8 is made of resin, for example.

Figure 7A:
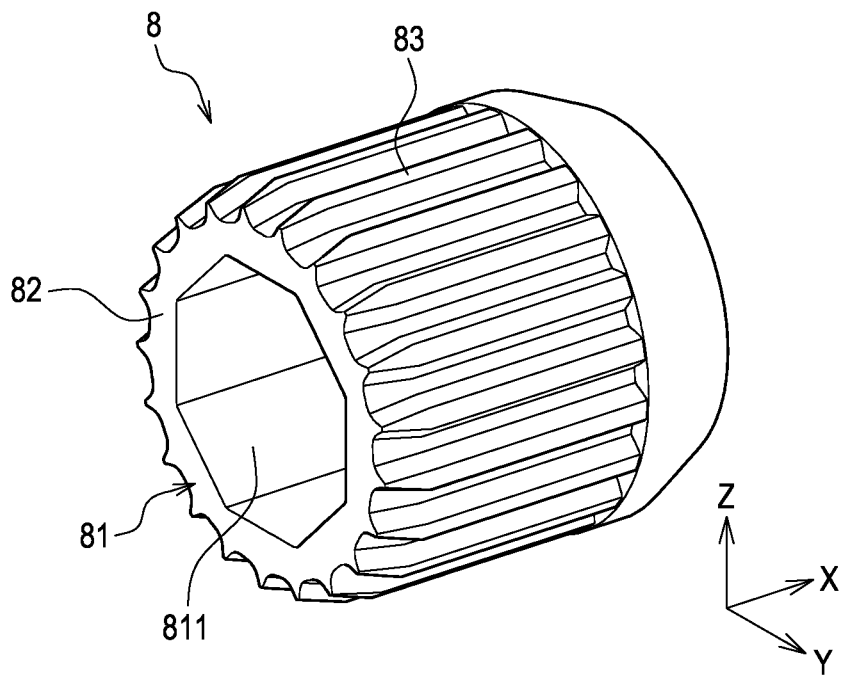
FIG. 7A and FIG. 7B are schematic perspective views of a cap of the gearbox in FIG. 2.
Figure 7B:
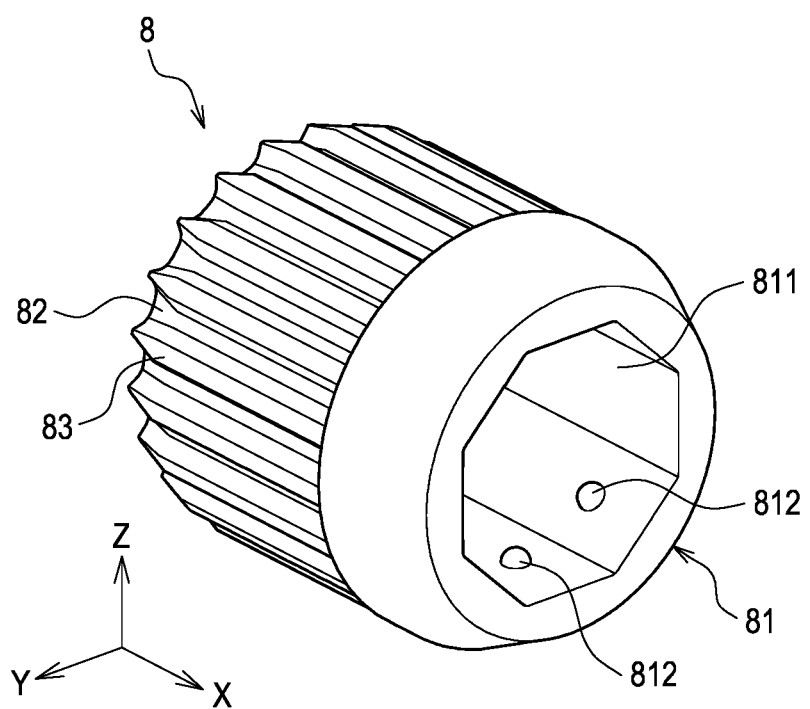

The engaging portion 81 is in engagement with the engaged portion 73 of the thrust bearing 7. The engaging portion 81 restricts movement of the thrust bearing 7 along the X-axis with respect to the cap 8. As illustrated in FIGS. 7A and 7B, the engaging portion 81 includes the first base 811 and first protrusions or recesses 812 (specifically, protrusions in the present embodiment).

The first base 811 is a cylindrical portion in which the inserted portion 731 of the thrust bearing 7 is inserted. The first base 811 has an inner peripheral surface forming, when viewed in a direction parallel to the central axis thereof, a polygonal shape that is substantially the same as the shape formed by the outer peripheral surface of the inserted portion 731.

The first protrusions or recesses 812 are formed in the inner peripheral surface of the first base 811, protruding radially inward from the inner peripheral surface of the first base 811. Each of the first protrusions or recesses 812 is engaged with one of the recesses 732 of the thrust bearing 7.

The removal stopper 82 is mounted to the shaft housing portion 51 to restrict removal of the thrust bearing 7 from the shaft housing portion 51 of the housing 5. In the present embodiment, the removal stopper 82 includes the cylindrical body of the first base 811.

The removal stopper 82 is inserted in the shaft housing portion 51, having a degree of strength so as not to be removed from the shaft housing portion 51 by the thrust load of the shaft 2. Specifically, the removal stopper 82 is fitted to the cap receiver 513 of the shaft housing portion 51 by, for example, press-fit such that an axial sliding resistance (that is, friction resistance) is caused against the cap receiver 513. In other words, the removal stopper 82 is compressed by the cap receiver 513 such that a radial stress is caused on the cap receiver 513.

The cap rotation stopper 83 restricts rotation of the engaging portion 81 and the removal stopper 82 about the central axis of the shaft 2 with respect to the housing 5. The cap rotation stopper 83 includes the serration with teeth extending from the outer circumferential surface of the removal stopper 82 and arranged in a row along the circumferential direction of the removal stopper 82.

As illustrated in FIG. 5B, each of the teeth of the cap rotation stopper 83 is inserted in one of the receiving grooves of the cap receiver 513. This configuration restricts rotation of the entire cap 8 with respect to the housing 5.

The thrust bearing 7 and the cap 8 may be coupled by, for example, a flexible coupling band. The coupling band is molded with, for example, resin integrally with the thrust bearing 7 and the cap 8.

<Method of Manufacturing Gearbox>

A method of manufacturing (that is, a method of assembling) the gearbox 1 will be described below. The manufacturing method according to the present embodiment includes holder insertion, shaft insertion, thrust bearing threaded engagement, and cap mounting.

<Holder Insertion>

In this step, the holder 52 holding the rotary bearing 4 is inserted into the shaft housing portion 51 of the housing 5 from the inner side of the housing 5 to the outer side (that is, toward the opening) of the housing 5.

<Shaft Insertion>

In this step, the actuator 6 with the shaft 2 coupled thereto is coupled to the housing 5. Accordingly, the shaft 2 is inserted into the holder 52 and the rotary bearing 4 in the shaft housing portion 51, and is brought into position in relation to the housing 5.

<Thrust Bearing Threaded Engagement>

In this step, the thrust bearing 7 is inserted from the opening of the shaft housing portion 51 into the shaft housing portion 51 in which the shaft 2 has been arranged.

Subsequently, the thrust bearing 7 is axially rotated for threaded engagement of the male screw portion 72 with the female screw portion 521 of the holder 52, thereby being coupled to the holder 52. Furthermore, the force applied portion 71 of the thrust bearing 7 is adjusted by a feed rate (that is, tightening amount) of the male screw portion 72 to a position to inhibit rattling of the leading-end of the shaft 2.

<Cap Mounting>

In this step, the cap 8 is mounted to the thrust bearing 7 coupled to the holder 52, and is fitted into the shaft housing portion 51.

Specifically, as the cap 8 is pushed into the cap receiver 513 of the shaft housing portion 51, the cap 8 slides against the thrust bearing 7 to thereby bring the engaging portion 81 of the cap 8 into engagement with the engaged portion 73 of the thrust bearing 7. The cap 8, while being elastically deformed, is brought into engagement with the thrust bearing 7 and is press-fitted into the cap receiver 513.

[1-2. Effects]

The embodiment described above in detail achieves the following effects.

(1a) The cap 8 restricts movement of the thrust bearing 7 in the axial direction of the shaft 2. This can minimize torque for fastening the male screw portion 72 of the thrust bearing 7 and the female screw portion 521 of the housing 5. Thus, this configuration can inhibit rattling of the shaft 2 while inhibiting an increase in sliding resistance at the end of the shaft 2.

(1b) The cap rotation stopper 83 of the cap 8 restricts rotation of the thrust bearing 7 with respect to the housing 5. This configuration inhibits the fastening between the male screw portion 72 and the female screw portion 521 from being loosened.

(1c) The rotation stopper 83 of the cap 8 includes the serration extending from the removal stopper 82. Thus, it is possible, with a relatively simple configuration, to enhance the effect of restricting rotation of the cap 8 with respect to the housing 5.

(1d) The holder 52 includes the female screw portion 521 and the bearing holder 522. Thus, an insertion of the holder 52 in the shaft housing portion 51 enables the rotary bearing 4 and the female screw portion 521 to be arranged within the housing 5.

(1e) The holder rotation stopper 523 of the holder 52 and the restrictor 511 of the shaft housing portion 51 restrict rotation and movement of the holder 52. This configuration inhibits the fastening between the male screw portion 72 and the female screw portion 521 from being loosened.

(1f) The engaging portion 81 of the cap 8 includes the first protrusions or recesses 812. Thus, it is possible to enhance the strength of the engagement of the cap 8 with the thrust bearing 7 with a relatively simple structure.

2. Other Embodiments

One embodiment of the present disclosure has been described hereinabove. However, it goes without saying that the present disclosure should not be limited to the embodiment and may be embodied in various forms.

Figure 8:
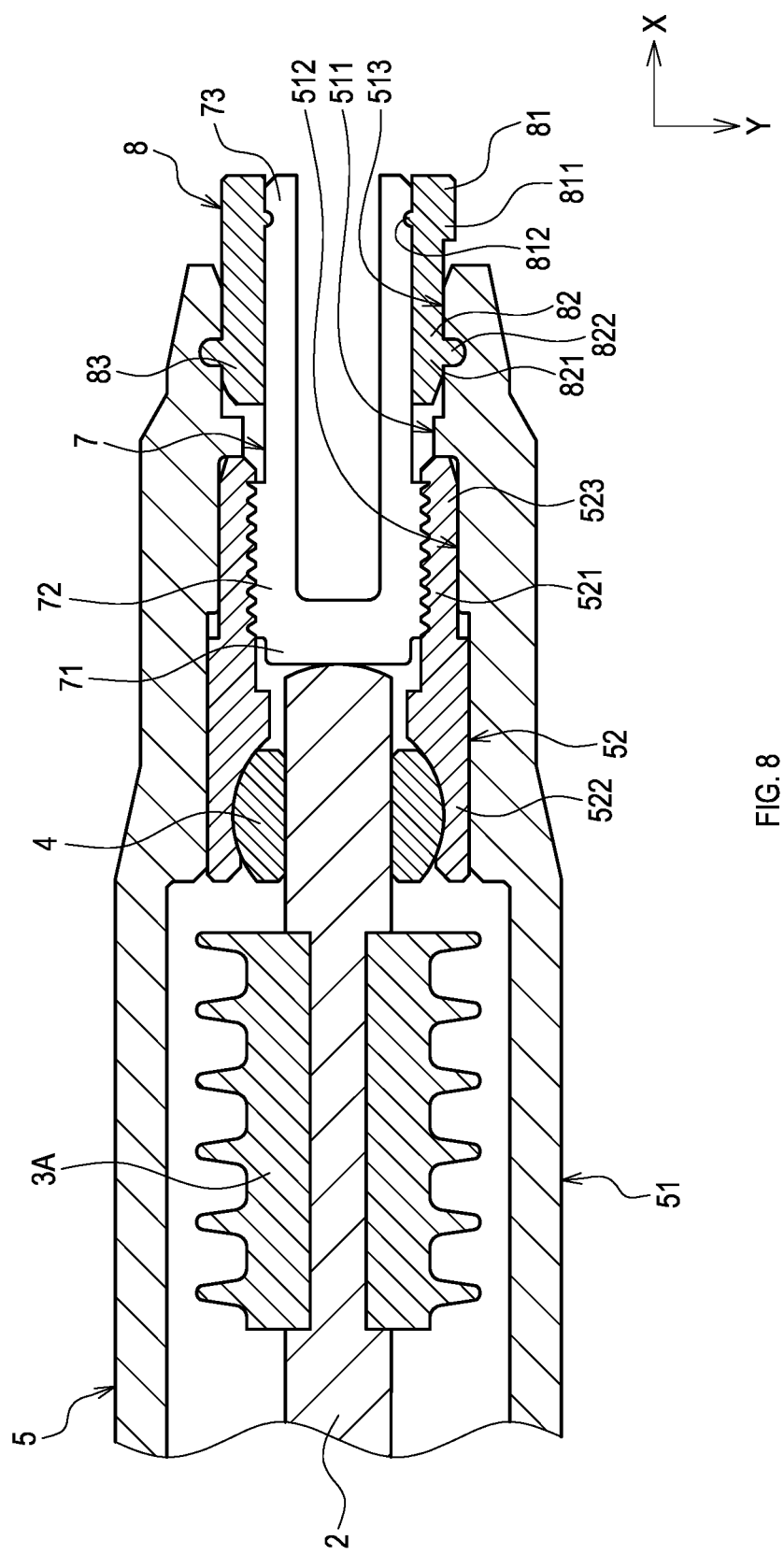
FIG. 8 is a schematic end view of a cross section of a gearbox according to another embodiment which is different from the embodiment in FIG. 4.

(2a) In the gearbox for a vehicle seat according to the aforementioned embodiment, the removal stopper 82 of the cap 8 may include, as illustrated in FIG. 8, a second base 821 and a second protrusion or recess 822. The second base 821 is a cylindrical portion inserted in the housing 5, and is part of the cylindrical body of the first base 811.

The second protrusion or recess 822 includes a recess or protrusion formed in the outer circumferential surface of the second base 821. The second protrusion or recess 822 is engaged with a protrusion or recess formed in the inner peripheral surface of the cap receiver 513 of the housing 5. Thus, it is possible, with a relatively simple configuration, to enhance the effect of inhibiting removal of the cap 8 from the housing 5.

(2b) In the gearbox for a vehicle seat according to the aforementioned embodiment, the first protrusions or recesses of the engaging portion of the cap may be recesses that are engaged with the protrusions formed in the engaged portion of the thrust bearing.

(2c) In the gearbox for a vehicle seat according to the aforementioned embodiment, the removal stopper of the cap may include a structure (a snap fit structure, for example) in which the removal stopper is engaged with the end of the shaft housing portion from outside of the housing.

(2d) In the gearbox for a vehicle seat according to the aforementioned embodiment, the cap rotation stopper may include, in the place of the serration, an outer peripheral surface that forms, when viewed in the axial direction, a polygonal shape. In addition, the holder rotation stopper may include a serration. The inserted portion of the thrust bearing also may include a serration.

Figure 9A:
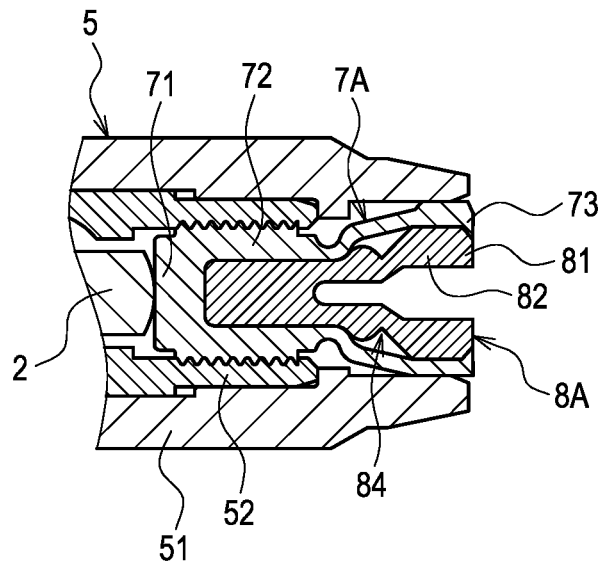
FIG. 9A is a schematic end view of a cross section of a gearbox according to still another embodiment which is different from the embodiment in FIG. 4.

(2e) In the gearbox for a vehicle seat according to the aforementioned embodiment, the cap does not have to be mounted to the housing. As illustrated in FIG. 9A, the gearbox for a vehicle seat may include a cap 8A that is not directly mounted to the housing 5, and a thrust bearing 7A in which the cap 8A is inserted.

The thrust bearing 7A includes the engaged portion 73 located outward of the housing 5 in relation to the male screw portion 72. The engaged portion 73 includes a claw protruding inward in the radial direction of the thrust bearing 7A.

The cap 8A includes the engaging portion 81 arranged to engage with the engaged portion 73 from inside of the thrust bearing 7A, and the removal stopper 82 inserted in the thrust bearing 7A to thereby press the thrust bearing 7A against the housing 5. The engaging portion 81 is fitted to the engaged portion 73 of the thrust bearing 7A by snap-fit. Pressing by the removal stopper 82 causes sliding resistance between the outer circumferential surface of the thrust bearing 7A and the inner circumferential surface of the shaft housing portion 51 of the housing 5.

Figure 9B:
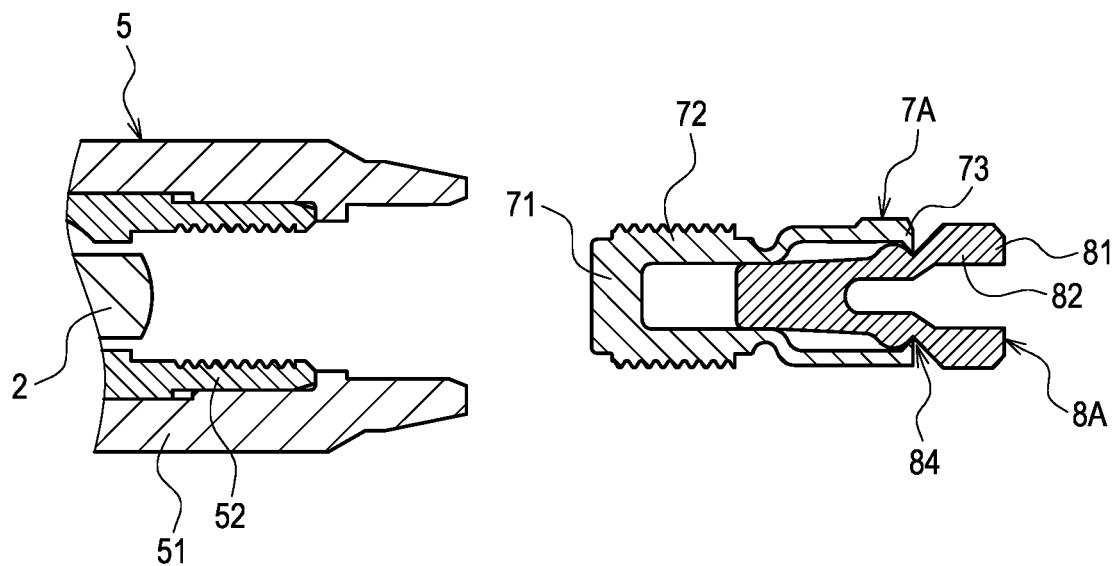
FIG. 9B is a schematic view of the gearbox in FIG. 9A, illustrating an example step of mounting a thrust bearing and a cap.

As illustrated in FIG. 9B, the cap 8A includes a groove 84 to which the engaged portion 73 of the thrust bearing 7A is hooked prior to thread engagement of the thrust bearing 7A with the housing 5. The groove 84 enables thread engagement of the thrust bearing 7A while the cap 8A is being held by the thrust bearing 7A. After thread engagement, the cap 8A is press-fitted to the thrust bearing 7A. This configuration can simplify mounting of the thrust bearing 7A and the cap 8A to the housing 5.

(2f) In the gearbox for a vehicle seat according to the aforementioned embodiment, the housing does not have to be provided with the holder. Alternatively, the female screw portion may be formed in the shaft housing portion of the housing, for example.

(2g) Functions of one component in the aforementioned embodiments may be achieved by two or more components, and a function of one component may be achieved by two or more components. Furthermore, functions of two or more components may be achieved by one component, and a function of two or more components may be achieved by one component. Moreover, part of the configurations of the aforementioned embodiments may be omitted. At least part of the configurations of the aforementioned embodiments may be added to or replaced with other configurations of the aforementioned embodiments. Any mode included in the technical ideas identified by the language in the claims are embodiments of the present disclosure.

What is claimed is:

1. A gearbox for a vehicle seat, the gearbox used in a movable mechanism configured to displace part of the vehicle seat, and the gearbox comprising:
    a shaft;
    a gear secured to the shaft;
    a rotary bearing rotatably supporting the shaft;
    a housing accommodating the shaft, the gear, and the rotary bearing therein, and including a female screw portion;
    a thrust bearing including:
        a force applied portion configured to be in contact with an end of the shaft;
        a male screw portion in thread engagement with the female screw portion; and
        an engaged portion arranged such that the male screw portion is interposed between the engaged portion and the force applied portion in an axial direction of the shaft; and
    a cap including:
        an engaging portion in engagement with the engaged portion of the thrust bearing; and
        a removal stopper restricting removal of the thrust bearing from the housing, the removal stopper being mounted to the housing, or inserted in the thrust bearing to thereby press the thrust bearing against the housing.

2. The gearbox for a vehicle seat according to claim 1,
    wherein the removal stopper is mounted to the housing, and
    wherein the cap includes a cap rotation stopper restricting rotation of the engaging portion and the removal stopper about a central axis of the shaft with respect to the housing.

3. The gearbox for a vehicle seat according to claim 2,
    wherein the removal stopper includes a cylindrical body inserted in the housing, and
    wherein the cap rotation stopper includes a serration with teeth extending from an outer circumferential surface of the removal stopper and arranged in a row along a circumferential direction of the removal stopper.

4. The gearbox for a vehicle seat according to claim 1,
    wherein the housing includes:
        a shaft housing portion with a cylindrical shape; and
        a cylindrical holder within the shaft housing portion, and
    wherein the holder includes:
        the female screw portion; and
        a bearing holder holding the rotary bearing.

5. The gearbox for a vehicle seat according to claim 4,
    wherein the holder includes a holder rotation stopper restricting rotation of the female screw portion and the bearing holder about a central axis of the shaft with respect to the shaft housing portion, and
    wherein the shaft housing portion includes a restrictor restricting movement of the holder in a transmission direction of a thrust load on the force applied portion.

6. The gearbox for a vehicle seat according to claim 1,
    wherein the engaging portion includes:
        a cylindrical first base in which the engaged portion of the thrust bearing is inserted; and
        a first protrusion or recess in an inner circumferential surface of the first base.

7. The gearbox for a vehicle seat according to claim 2,
    wherein the removal stopper includes:
        a cylindrical second base inserted in the housing; and
        a second protrusion or recess in an outer circumferential surface of the second base.

* * * * *